(12) United States Patent
Kozono

(10) Patent No.: US 12,005,836 B2
(45) Date of Patent: Jun. 11, 2024

(54) VEHICLE NOTIFICATION APPARATUS

(71) Applicant: SUBARU CORPORATION, Tokyo (JP)

(72) Inventor: Kazuya Kozono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/443,716

(22) Filed: Jul. 27, 2021

(65) Prior Publication Data
US 2022/0024382 A1 Jan. 27, 2022

(30) Foreign Application Priority Data

Jul. 27, 2020 (JP) ................................ 2020-126681

(51) Int. Cl.
*B60Q 9/00* (2006.01)
*G06V 20/56* (2022.01)
*G06V 20/58* (2022.01)

(52) U.S. Cl.
CPC ............. *B60Q 9/008* (2013.01); *G06V 20/58* (2022.01); *G06V 20/588* (2022.01)

(58) Field of Classification Search
CPC . B60Q 9/008; B60Q 1/52; B60Q 1/46; B60Q 5/00; B60Q 5/005; B60Q 9/00;
(Continued)

(56) References Cited

U.S. PATENT DOCUMENTS

| 2008/0224840 A1* | 9/2008 | Kawachi | ................ | B60K 35/00 340/441 |
| 2012/0326967 A1* | 12/2012 | Gohng | .................. | B60W 50/14 345/156 |
| 2018/0257565 A1* | 9/2018 | Nogimori | .............. | G06V 20/56 |

FOREIGN PATENT DOCUMENTS

| CN | 109177911 A * | 1/2019 | ............. B60Q 5/006 |
| DE | 102018114665 A1 * | 12/2018 | ............... B60R 1/00 |

(Continued)

OTHER PUBLICATIONS

Notice of Reasons for Refusal issued in Japanese Patent Application No. 2020-126681 dated Dec. 5, 2023, with machine translation.

*Primary Examiner* — James J Yang
*Assistant Examiner* — Anthony D Afrifa-Kyei
(74) *Attorney, Agent, or Firm* — TROUTMAN PEPPER HAMILTON SANDERS LLP

(57) ABSTRACT

A vehicle notification apparatus is configured to make a notification for an occupant depending on a running status of a vehicle and includes a vehicle status determination device, a display device, a steering wheel sensor, and a calculation control device. The vehicle status determination device is configured to determine, on the basis of a threshold, whether a notification is to be made for the running status. The display device is configured to display a predetermined notification in a case where the vehicle status determination device determined that the notification is to be made. The steering wheel sensor is configured to detect a rotation angle of a steering wheel while the display device is displaying the predetermined notification. The calculation control device is configured to supplement or change the displayed predetermined notification on the basis of the detected rotation angle of the steering wheel.

15 Claims, 8 Drawing Sheets

(58) Field of Classification Search
CPC .... G06V 20/58; G06V 20/588; G06V 20/597; B62D 5/049; B62D 15/029; B62D 15/025; B62D 5/04; B62D 6/00; B62D 6/04; B62D 15/021; B62D 15/027; B62D 6/002; B62D 6/003; B62D 6/006; B62D 6/10; B60K 28/10; G06K 9/00798; G06K 9/00845; G08B 21/00; G08G 1/16; B60W 40/08; B60W 50/14; B60W 50/16; B60W 60/00186; B60W 2040/0818; B60W 2040/0827; B60W 2050/143; B60W 2050/146; B60W 2540/229; B60Y 2302/05; G01M 17/06
See application file for complete search history.

(56) References Cited

FOREIGN PATENT DOCUMENTS

| | | | | | |
|---|---|---|---|---|---|
| DE | 102019211657 | A1 | * | 2/2021 | |
| GB | 2550242 | A | * | 11/2017 | ............. B60K 35/00 |
| JP | 10-241097 | A | | 9/1998 | |
| JP | 2005-329811 | A | | 12/2005 | |
| JP | 2008-221998 | A | | 9/2008 | |
| JP | 4447697 | B2 | * | 4/2010 | ............... B62D 1/28 |
| JP | 2014-083984 | A | | 5/2014 | |
| JP | 2017-68440 | A | | 4/2017 | |

\* cited by examiner

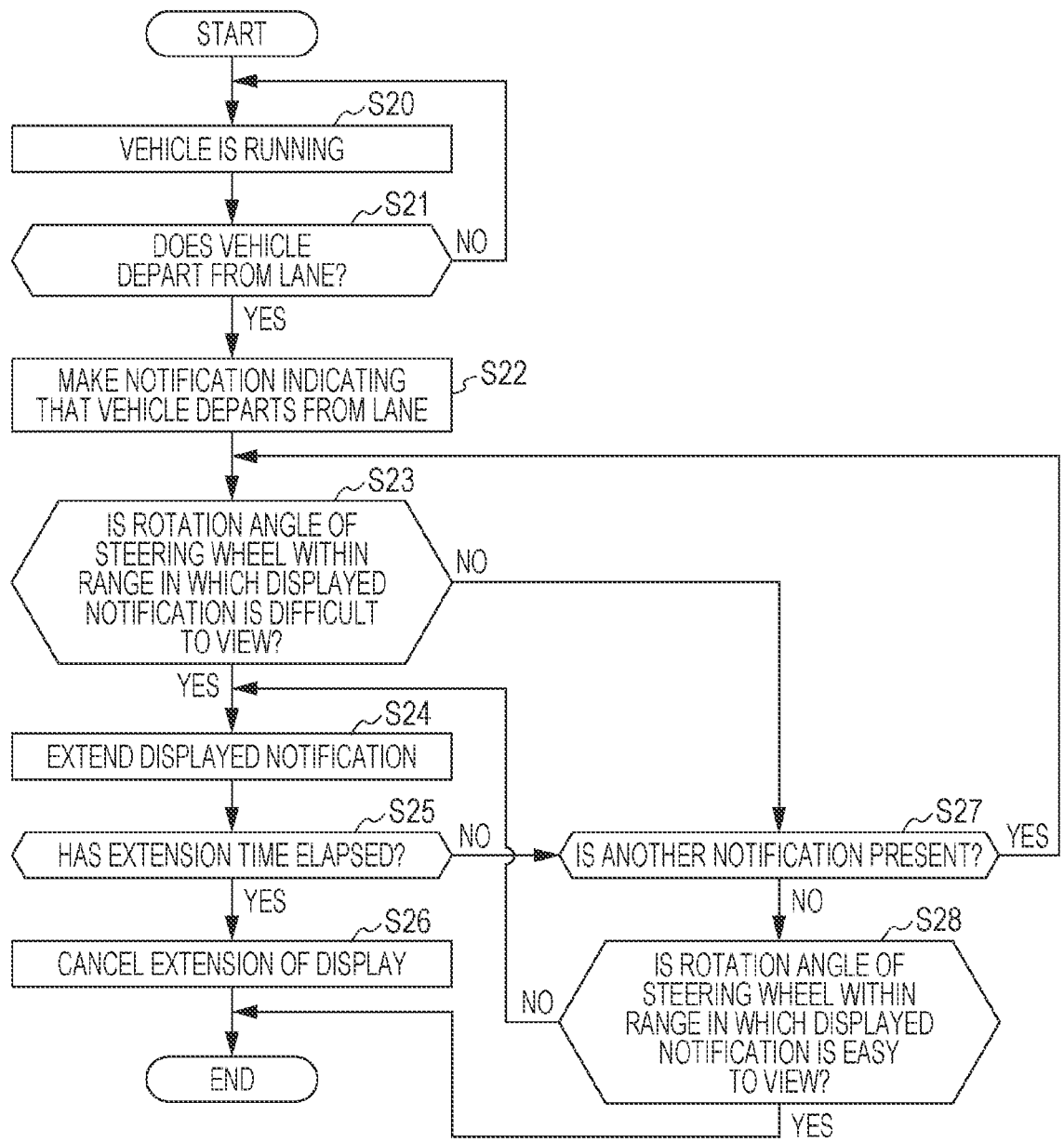

VEHICLE NOTIFICATION APPARATUS

CROSS-REFERENCE TO RELATED APPLICATIONS

The present application claims priority from Japanese Patent Application No. 2020-126681 filed on Jul. 27, 2020, the entire contents of which are hereby incorporated by reference.

BACKGROUND

The disclosure relates to a vehicle notification apparatus and particularly to a vehicle notification apparatus that makes a notification regarding safety for an occupant in accordance with the status of a vehicle.

In recent years, a vehicle notification apparatus is mounted on a vehicle. When the status regarding safety changes, the vehicle notification apparatus notifies an occupant of the change.

As an example of the notification, if an obstacle is detected behind a vehicle that is backing up, the occupant may be notified of the presence of the obstacle. In one example, while the vehicle is backing up for parking, if an obstacle such as another vehicle is present near the traveling direction of the vehicle, a warning is displayed on a display or the like of the vehicle, and also, a notification sound is output within the cabin. Thus, an occupant who drives the vehicle can notice the presence of the obstacle behind the vehicle and can prevent the vehicle from colliding with the obstacle. Such a vehicle notification apparatus is described in Japanese Unexamined Patent Application Publication No. 2017-68440, for example.

SUMMARY

An aspect of the disclosure provides a vehicle notification apparatus configured to make a notification for an occupant of a vehicle depending on a running status of the vehicle. The vehicle notification apparatus includes a vehicle status determination device, a display device, a steering wheel sensor, and a calculation control device. The vehicle status determination device is configured to determine, on the basis of a predetermined threshold, whether the running status of the vehicle is a status for which a notification is to be made. The display device is configured to display a predetermined notification in a case where the vehicle status determination device determines that the running status of the vehicle is the status for which the notification is to be made. The steering wheel sensor is configured to detect a rotation angle of a steering wheel of the vehicle while the display device is displaying the predetermined notification. The calculation control device is configured to perform an operation of supplementing or changing the displayed predetermined notification on the basis of the rotation angle of the steering wheel detected by the steering wheel sensor.

An aspect of the disclosure provides a vehicle notification apparatus configured to make a notification for an occupant of a vehicle depending on a running status of the vehicle. The vehicle notification apparatus includes circuitry, a display device, and a steering wheel sensor. The circuitry is configured to determine, on the basis of a predetermined threshold, whether the running status of the vehicle is a status for which a notification is to be made. The display device is configured to display a predetermined notification in a case where the circuitry determines that the running status of the vehicle is the status for which the notification is to be made. The steering wheel sensor is configured to detect a rotation angle of a steering wheel of the vehicle while the display device is displaying the predetermined notification. The circuitry is configured to perform an operation of supplementing or changing the displayed predetermined notification on the basis of the rotation angle of the steering wheel detected by the steering wheel sensor.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIGS. 2A to 2C illustrate the vehicle including the vehicle notification apparatus according to the embodiment of the disclosure, in which FIG. 2A illustrates a dashboard and a vicinity thereof, FIG. 2B illustrates the configuration of a steering wheel, and FIG. 2C illustrates a first region and a second region of the steering wheel;

FIGS. 4B and 4C illustrate behaviors of the steering wheel;

FIG. 5 is a flowchart illustrating the operation of the vehicle notification apparatus according to the embodiment of the disclosure;

FIGS. 6B and 6C illustrate behaviors of the steering wheel;

DETAILED DESCRIPTION

The above vehicle notification apparatus has room for improvement in terms of reliably making a notification regarding safety.

In one example, the notification regarding safety may be displayed on an information display disposed forward of a steering wheel. In such a case, depending on the rotation angle of the steering wheel, the notification displayed on the information display may be shielded by a spork of the steering wheel, for example, and it may be difficult for an occupant to notice the displayed notification. In such a case, the occupant may possibly miss the displayed notification regarding safety and be unable to make decision or take action appropriately, which may decrease the safety of the vehicle.

It is desirable to provide a vehicle notification apparatus that can reliably make a notification for an occupant regardless of the rotation angle of the steering wheel.

Now, a vehicle notification apparatus according to an embodiment of the disclosure will be described in detail with reference to the drawings. Among the front-back direction, the top-down direction, and the right-left direction, the right and left in the following description are the right and left for the driver of a vehicle 10. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
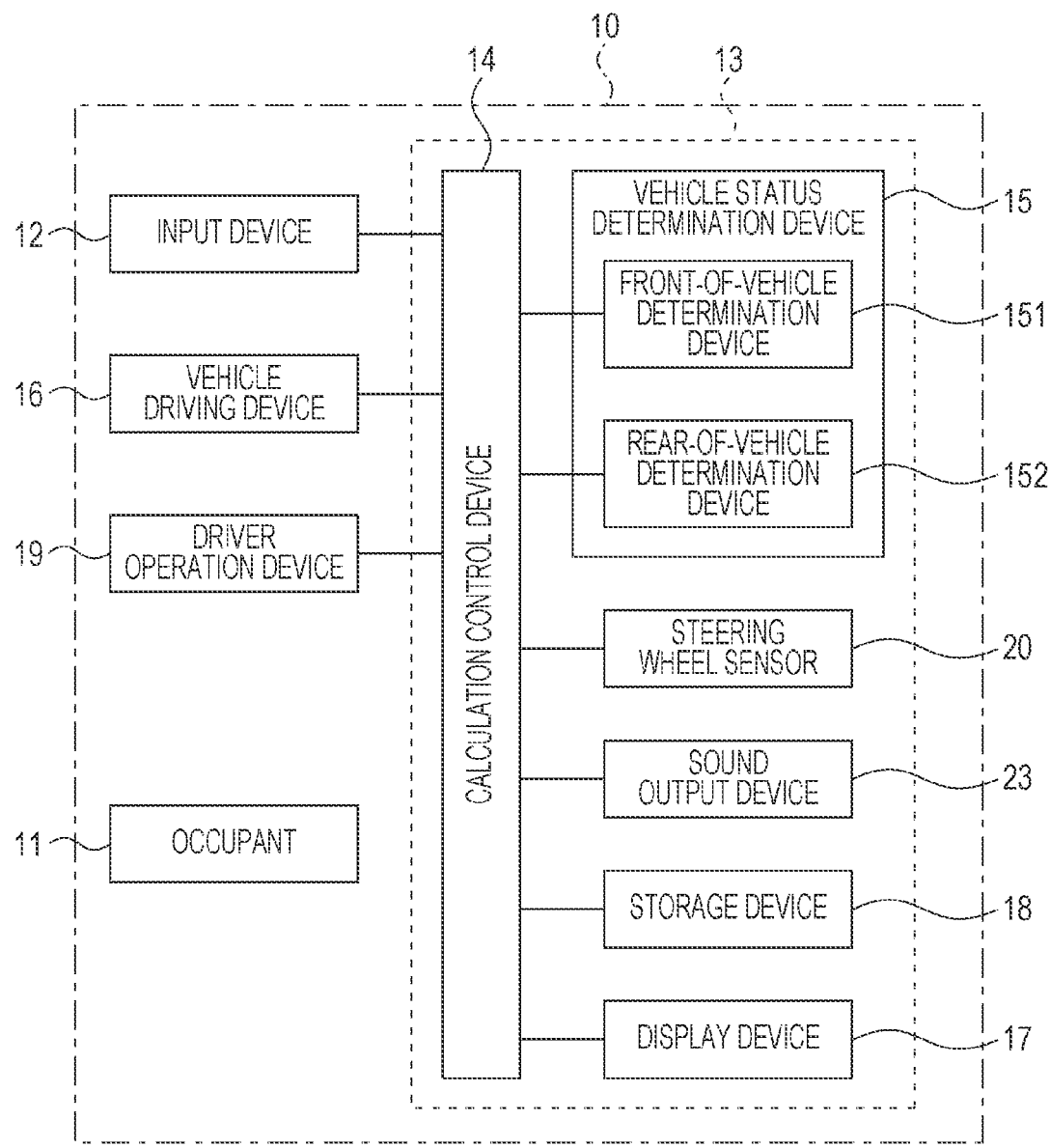
FIG. 1 is a block diagram illustrating a vehicle including a vehicle notification apparatus according to an embodiment of the disclosure.

FIG. 1 is a block diagram illustrating the vehicle 10 including a vehicle notification apparatus 13.

The vehicle 10 includes a calculation control device 14, an input device 12, a vehicle driving device 16, a driver's operation device 19, a vehicle status determination device 15, a steering wheel sensor 20, a sound output device 23, a storage device 18, and a display device 17.

The calculation control device 14 is a controller of the vehicle 10 and is, for example, an electronic control unit (ECU) including a calculation device that performs various calculations or the like. On the basis of input information that is input from the input device 12, for example, the calculation control device 14 performs a predetermined calculation process that is expected for the vehicle 10 to run. In addition, on the basis of the rotation angle of a steering wheel 22, detected by the steering wheel sensor 20, the calculation control device 14 performs an operation of supplementing or changing the displayed notification, as will be described later. Herein, the operation of supplementing the displayed notification is, for example, an operation of extending the notification. In addition, the operation of changing the displayed notification is, for example, an operation of blinking the notification.

Furthermore, the calculation control device 14 also performs a predetermined calculation process for making the vehicle notification apparatus 13 operate. In one example, on the basis of the rotation angle of the steering wheel 22, detected by the steering wheel sensor 20, the calculation control device 14 performs an operation of supplementing the displayed notification, as will be described later. The notification described later herein is also made at the time of an automatic operation of braking, accelerating, or steering.

The input device 12 includes a switch, such as a push button, a touch panel, or the like operable by an occupant 11 who is a driver. By the occupant 11 operating the input device 12, an instruction for starting or ending various functions of the vehicle 10 can be issued.

The vehicle driving device 16 includes an engine, a motor, or the like serving as a power source for making the vehicle 10 run. In accordance with the amount of operation of the vehicle status determination device 15 performed by the occupant 11, the vehicle driving device 16 accelerates, decelerates, and steers the vehicle 10.

The driver's operation device 19 is configured to receive an operation performed by the occupant 11 who drives the vehicle 10 to steer the vehicle 10 and adjust the speed of the vehicle 10. In one example, the driver's operation device 19 includes a steering wheel, an accelerator pedal, and a brake pedal, which are not illustrated in FIG. 1.

The vehicle status determination device 15 determines whether the running status of the vehicle 10 is a status for which a notification is to be made for safety. The vehicle status determination device 15 includes a front-of-vehicle determination device 151 and a rear-of-vehicle determination device 152.

The front-of-vehicle determination device 151 is a device that determines the status in front of the vehicle 10 and is, for example, a camera unit that captures images of the front of the vehicle 10 or a radar device or a sonar device that determines the status in front of the vehicle 10.

The rear-of-vehicle determination device 152 is a device that determines the status in the rear of the vehicle 10 and is, for example, a camera unit that captures images of the rear of the vehicle 10 or a radar device or a sonar device that determines the status in the rear of the vehicle 10.

The steering wheel sensor 20 detects the rotation angle of the steering wheel 22 while the display device 17 is displaying a notification.

The sound output device 23 is, for example, a speaker that outputs a predetermined sound toward the inside of the cabin. The sound output device 23 outputs a sound for making a notification for the occupant 11 in the cabin of the vehicle 10.

The storage device 18 includes a random access memory (RAM) or a read-only memory (ROM) and stores information to be used by the vehicle 10 to run. The storage device 18 also stores a program to be used for performing an operation of the vehicle notification apparatus 13.

The display device 17 is a display including a liquid crystal panel or the like disposed in or near the dashboard in the cabin, for example, and displays information related to the running of the vehicle 10 in order to notify the occupant 11. The display device 17 also displays a predetermined notification regarding safety if the running status determined by the vehicle status determination device 15 is a status for which a notification is to be made. The display device 17 is, for example, a multi-information display 24 described later.

Herein, among the above elements, the vehicle notification apparatus 13 includes the calculation control device 14, the vehicle status determination device 15, the steering wheel sensor 20, the sound output device 23, the storage device 18, and the display device 17. The vehicle notification apparatus 13 makes a notification regarding safety for the occupant 11 in accordance with the status of the vehicle 10, as will be described later.

Figure 2A:
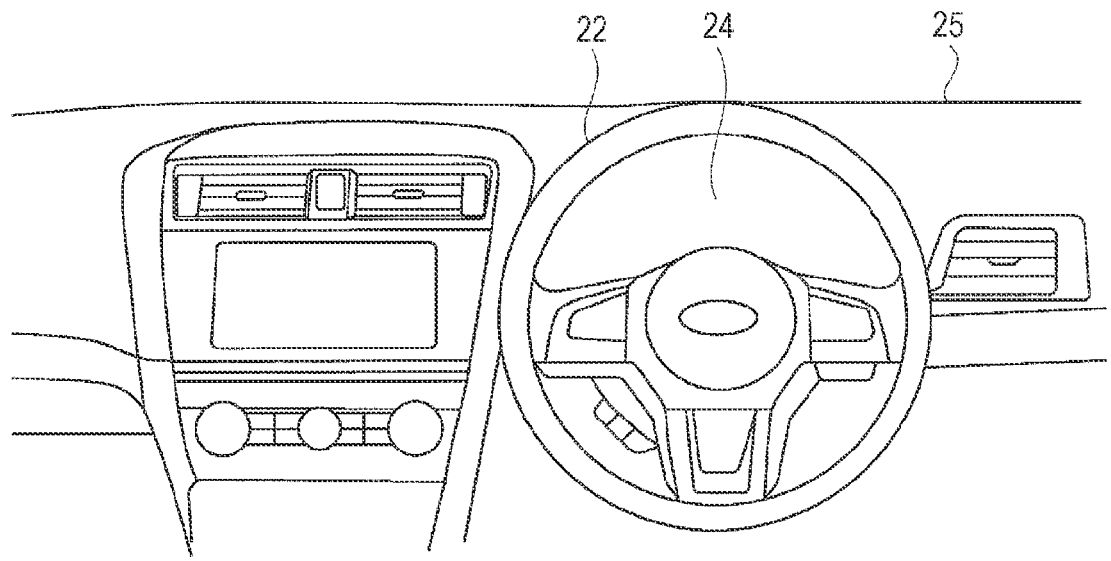
Figure 2B:
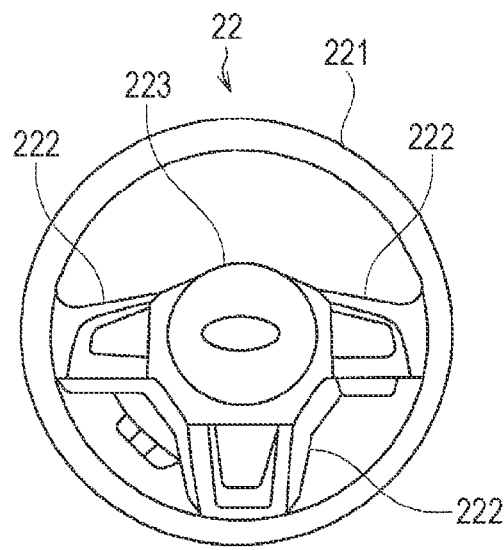
Figure 2C:
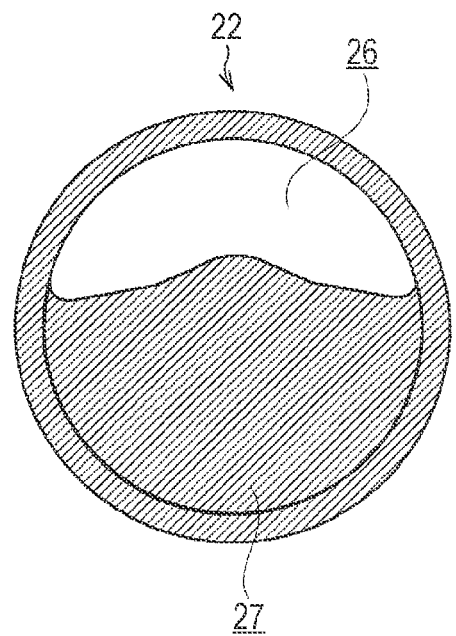

FIG. 2A illustrates a dashboard 25 and a vicinity thereof, FIG. 2B illustrates the configuration of the steering wheel 22, and FIG. 2C illustrates a first region 26 and a second region 27 of the steering wheel 22.

Referring to FIG. 2A, the multi-information display 24 serving as the display device 17 is disposed in the dashboard 25. The multi-information display 24 is disposed forward of the steering wheel 22.

Referring to FIG. 2B, the steering wheel 22 includes a rim 221, a center pad 223, and sporks 222. The center pad 223 is disposed in a center portion of the steering wheel 22. The rim 221 and the center pad 223 are coupled via the three sporks 222. The sporks 222 are disposed in a lower portion of the steering wheel 22.

Referring to FIG. 2C, an inside portion of the steering wheel 22 can be divided into the first region 26 and the second region 27. Since the sporks 222 are not disposed in the first region 26, the occupant 11 can easily view the multi-information display 24 through the first region 26. Since the sporks 222 are disposed in the second region 27, the occupant 11 does not easily view the multi-information display 24 through the second region 27.

In this embodiment, as will be described later, if the multi-information display 24 is shielded by the second region 27, the operation of supplementing the notification displayed on the multi-information display 24 enables the occupant 11 to be notified of the displayed notification more reliably.

Figure 3:
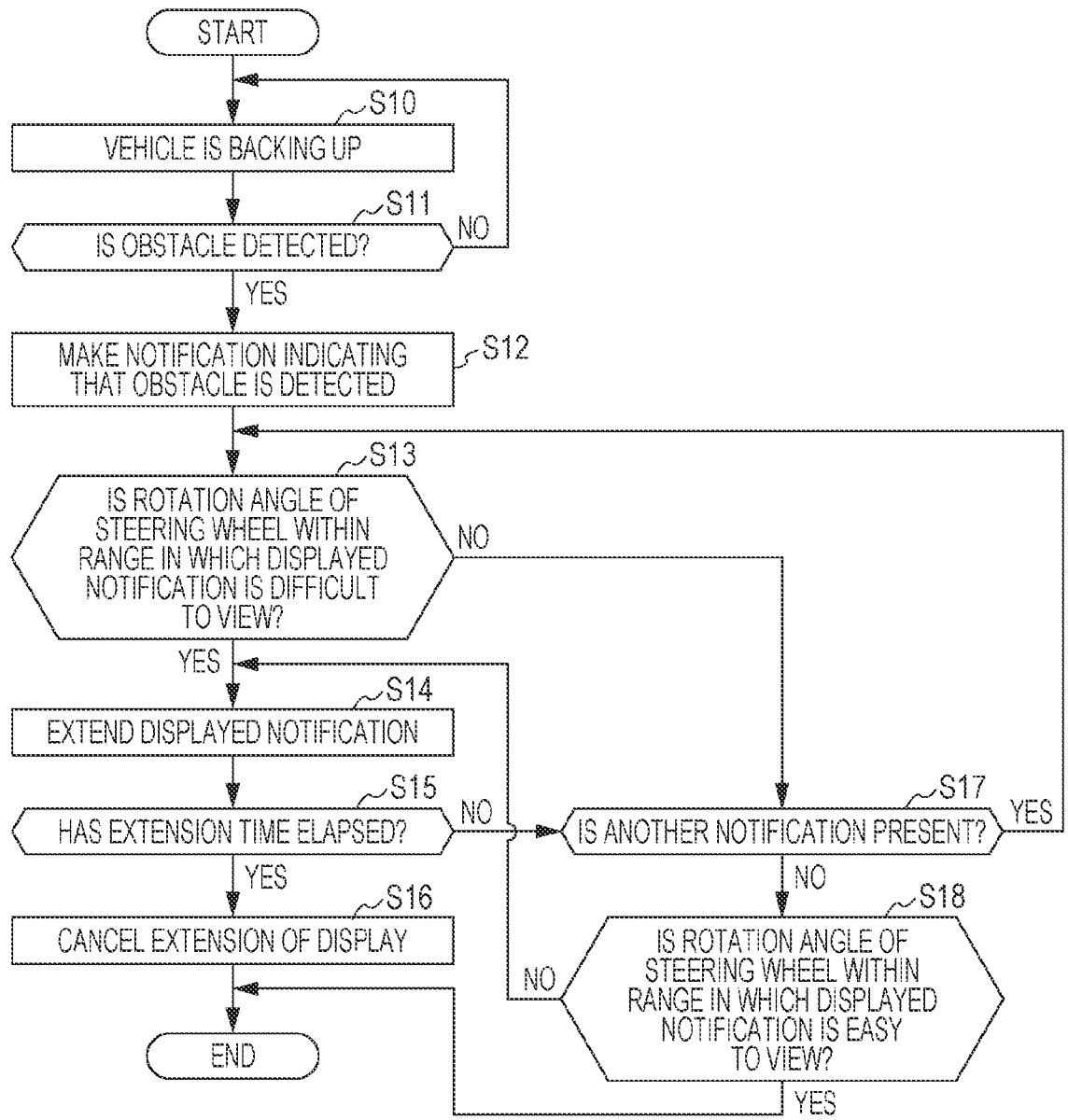
FIG. 3 is a flowchart illustrating the operation of the vehicle notification apparatus according to the embodiment of the disclosure.
Figure 4A:
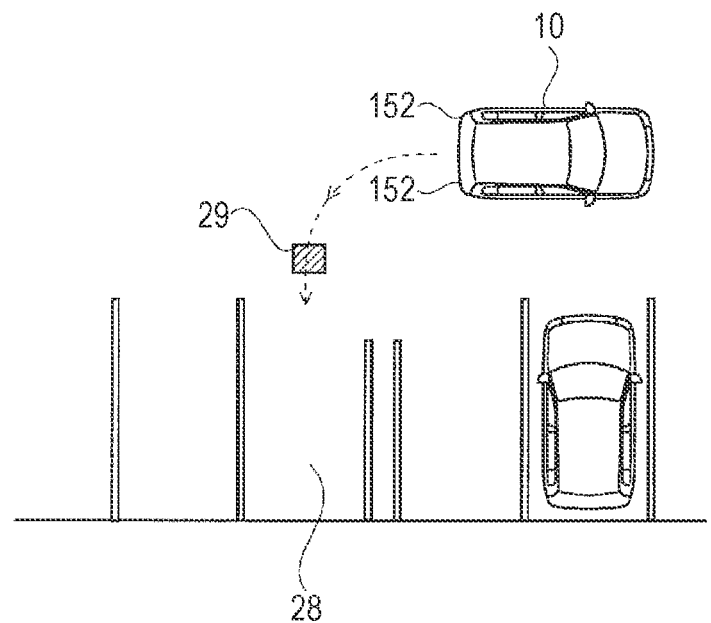
FIGS. 4A to 4C illustrate the operation of the vehicle notification apparatus according to the embodiment of the disclosure, in which FIG. 4A schematically illustrates a status in which the vehicle is backing up.
Figure 4B:
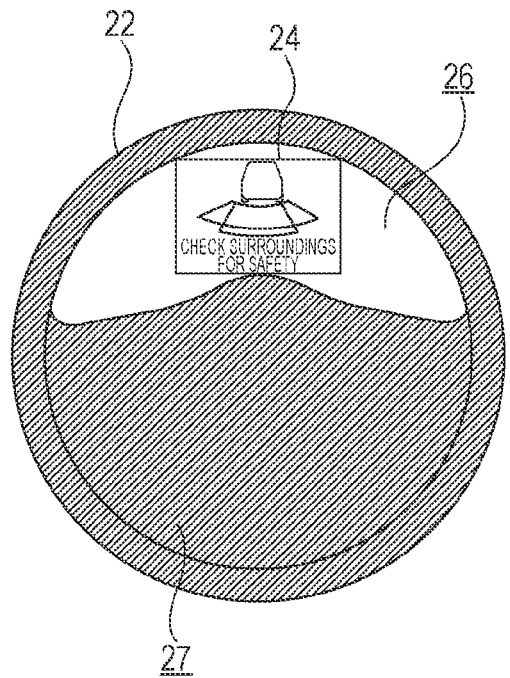
Figure 4C:
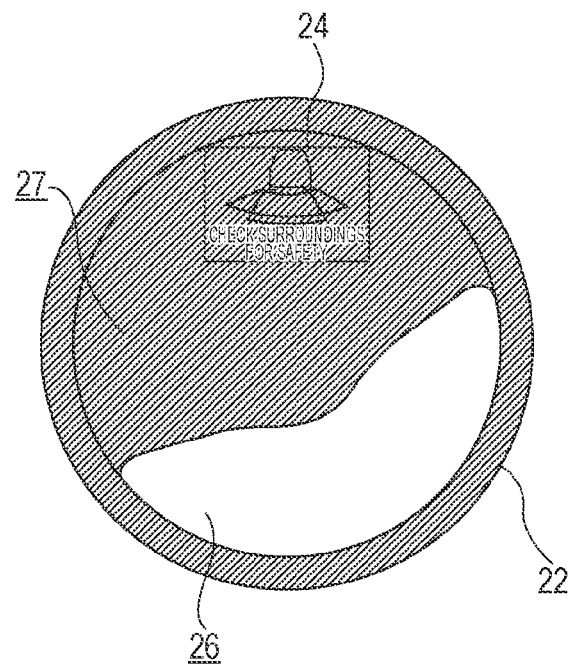

Referring to FIG. 3 and FIGS. 4A to 4C, the operation of supplementing the notification will be described. In the operation, if an obstacle 29 is present behind the vehicle 10 that is backing up, the occupant 11 is notified of the presence of the obstacle 29, and further, in accordance with the status of the steering wheel 22, the notification is supplemented. FIG. 3 is a flowchart illustrating the operation of the vehicle notification apparatus 13. FIG. 4A schematically illustrates a status in which the vehicle 10 is backing up, and FIGS. 4B and 4C illustrate behaviors of the steering wheel 22.

In step S10, the vehicle 10 is backing up on the basis of an operation performed by the occupant 11. Herein, as illustrated in FIG. 4A, the vehicle 10 is backing up to park in a parking space 28.

In step S11, the calculation control device 14 determines, on the basis of a predetermined threshold, whether the running status of the vehicle 10 is a status for which a notification is to be made. Herein, it is determined whether the distance between the vehicle 10 and the obstacle 29 is less than a predetermined distance that is set as the threshold. Referring to FIG. 4A, while the vehicle 10 is backing up, the rear-of-vehicle determination device 152 constantly measures the distance between the vehicle 10 and the obstacle 29.

If the determination in step S11 is YES, that is, if the distance between the vehicle 10 and the obstacle 29 illustrated in FIG. 4A is less than the threshold, the calculation control device 14 advances to step S12.

If the determination in step S11 is NO, that is, if the distance between the vehicle 10 and the obstacle 29 illustrated in FIG. 4A is greater than or equal to the threshold, the calculation control device 14 returns to step S10 without making any notification, and the vehicle 10 continues backing up.

In step S12, the calculation control device 14 makes a notification indicating that the obstacle 29 is present as a predetermined notification regarding safety to be displayed. In one example, as illustrated in FIG. 4B, a message indicating that the obstacle 29 is present behind the vehicle 10 is displayed on the multi-information display 24. At the same time, in response to an instruction from the calculation control device 14, the sound output device 23 may output a sound indicating that the obstacle 29 is present behind the vehicle 10.

In step S13, the calculation control device 14 determines whether the rotation angle of the steering wheel 22 is in a range in which the displayed notification is difficult to view. The rotation angle of the steering wheel 22 can be detected by the steering wheel sensor 20 illustrated in FIG. 1. The rotation angle of the steering wheel 22 can also be detected from the steering angle of tires, which are not illustrated herein.

If the determination in step S13 is YES, that is, if the rotation angle of the steering wheel 22 is in a range in which the second region 27 shields the multi-information display 24 as illustrated in FIG. 4C, the calculation control device 14 advances to step S14.

If the determination in step S13 is NO, that is, if the rotation angle of the steering wheel 22 is in a range in which the occupant 11 can favorably view the multi-information display 24 through the first region 26 as illustrated in FIG. 4B, the calculation control device 14 advances to step S17.

In step S14, in order to perform a notification operation, the calculation control device 14 extends the displayed notification. In one example, the calculation control device 14 extends the time for displaying the presence of the obstacle 29 on the multi-information display 24 illustrated in FIG. 4B. By extending the display time in this manner, the occupant 11 is likely to notice the presence of the obstacle 29.

Furthermore, in step S14, as a notification operation or a change operation, a notification sound indicating that the obstacle 29 is present can be output from the sound output device 23. Furthermore, the notification sound may be extended. Thus, even if the multi-information display 24 is shielded by the second region 27, the occupant 11 can notice the presence of the obstacle 29 by the notification sound.

In step S15, the calculation control device 14 determines whether the extension time of the displayed notification has ended.

If the determination in step S15 is YES, that is, if the extension time of the displayed notification has ended, the calculation control device 14 advances to step S16.

If the determination in step S15 is NO, that is, if the extension time of the displayed notification has not ended, the calculation control device 14 advances to step S17.

In step S16, the calculation control device 14 cancels the displaying of the notification indicating that the obstacle 29 is present, the notification illustrated in FIG. 4B or the like. This can prevent the occupant 11 from losing concentration as a result of the notification displayed for an excessively long time.

In step S17, the calculation control device 14 determines whether another notification interrupts. Herein, an example of the other notification is a notification indicating an emergency brake because a motorcycle is passing nearby.

If the determination in step S17 is YES, that is, if another notification interrupts, the calculation control device 14 advances to step S13.

If the determination in step S17 is NO, that is, there is no other notification to interrupt, the calculation control device 14 advances to step S18.

In step S18, the calculation control device 14 determines whether the rotation angle of the steering wheel 22 detected by the steering wheel sensor 20 is within a range in which the displayed notification is easy to view.

If the determination in step S18 is YES, that is, if the notification displayed on the multi-information display 24 is favorably viewed through the first region 26 of the steering wheel 22 as illustrated in FIG. 4B, the calculation control device 14 ends the operation of the notification process.

If the determination in step S18 is NO, that is, if the notification displayed on the multi-information display 24 is difficult to view owing to the second region 27 of the steering wheel 22 as illustrated in FIG. 4C, the calculation control device 14 advances to step S24 and performs an operation of supplementing the displayed notification.

The operation that is performed if the obstacle 29 is detected while the vehicle 10 is backing up is described above.

Figure 6A:
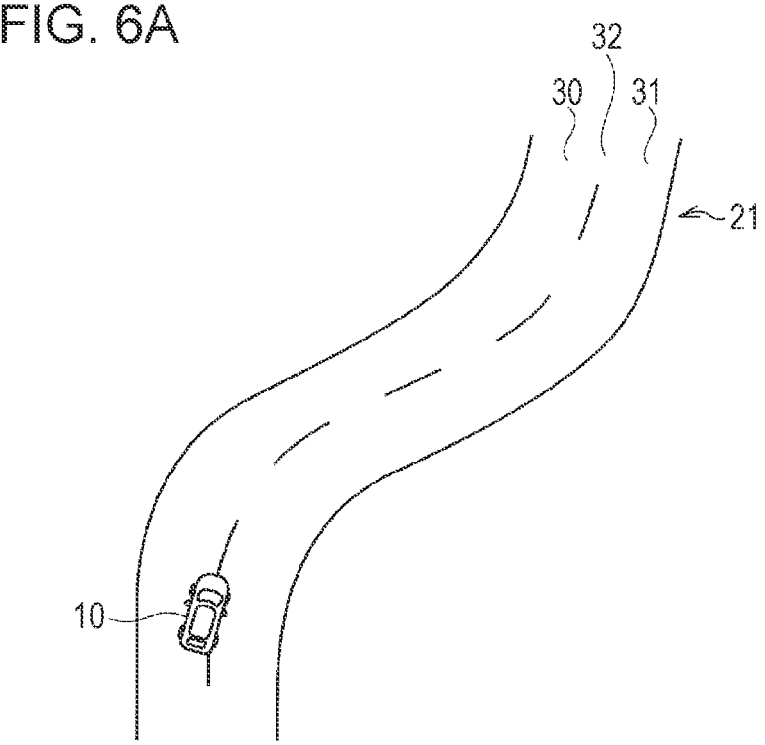
FIGS. 6A to 6C illustrate the operation of the vehicle notification apparatus according to the embodiment of the disclosure, in which FIG. 6A schematically illustrates a status in which the vehicle is running on a road.
Figure 6B:
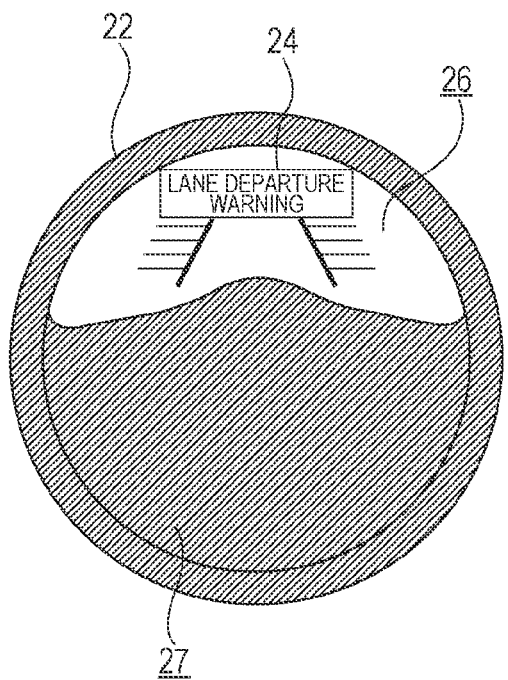
Figure 6C:
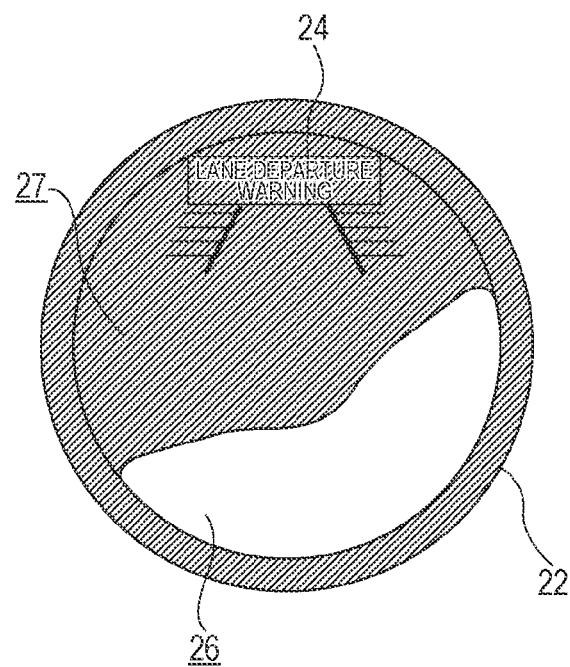

Referring to FIG. 5 and FIGS. 6A to 6C, another operation of supplementing a notification will be described. In the operation, if the running vehicle 10 departs from a lane marker 32, the occupant 11 is notified of the departure, and further, in accordance with the status of the steering wheel 22, the notification is supplemented. FIG. 5 is a flowchart illustrating the operation of the vehicle notification apparatus 13. FIG. 6A schematically illustrates a status in which the vehicle 10 is running on a road 21, and FIGS. 6B and 6C illustrate behaviors of the steering wheel 22.

In step S20, referring to FIG. 6A, the vehicle 10 driven by the occupant 11 is running on the road 21. The road 21 includes a lane 30 and a lane 31, and the vehicle 10 is running in the lane 30.

In step S21, the calculation control device 14 determines, on the basis of a predetermined threshold, whether the running status of the vehicle 10 is a status for which a notification is to be made. Herein, it is determined whether the amount of departure by which the vehicle 10 departs from the lane 30 is less than a threshold. In one example, referring to FIG. 6A, while the vehicle 10 is running on the road 21, the front-of-vehicle determination device 151 constantly senses the lane marker 32 and the lane 30 in which the vehicle 10 is running.

If the determination in step S21 is YES, that is, if the amount of departure by which the vehicle 10 departs from the lane marker 32 illustrated in FIG. 6A is greater than or equal to the threshold, the calculation control device 14 advances to step S22.

If the determination in step S21 is NO, that is, if the amount of departure by which the vehicle 10 departs from the lane marker 32 is less than the threshold, the calculation control device 14 returns to step S20 without making any notification.

In step S22, the calculation control device 14 makes a notification indicating that the vehicle 10 departs from the lane marker 32 as a predetermined notification regarding safety. In one example, as illustrated in FIG. 6B, information indicating that the vehicle 10 departs from the lane marker 32 is displayed on the multi-information display 24. At the same time, in response to an instruction from the calculation control device 14, the sound output device 23 may output a sound indicating that the vehicle 10 departs from the lane marker 32.

In step S23, the calculation control device 14 determines whether the rotation angle of the steering wheel 22 is in a range in which the displayed notification is difficult to view. The rotation angle of the steering wheel 22 can be detected by the steering wheel sensor 20 illustrated in FIG. 1. The rotation angle of the steering wheel 22 can also be detected from the steering angle of tires, which are not illustrated herein.

If the determination in step S23 is YES, that is, if the rotation angle of the steering wheel 22 is in a range in which the second region 27 shields the multi-information display 24 as illustrated in FIG. 6C, the calculation control device 14 advances to step S24.

If the determination in step S23 is NO, that is, if the rotation angle of the steering wheel 22 is in a range in which the occupant 11 can favorably view the multi-information display 24 through the first region 26 as illustrated in FIG. 6B, the calculation control device 14 advances to step S27.

In step S24, in order to change or supplement the notification, the calculation control device 14 extends the displayed notification. In one example, the calculation control device 14 extends the time for displaying the information indicating that the vehicle 10 departs from the lane marker 32 on the multi-information display 24 illustrated in FIG. 6B. By extending the display time in this manner, the occupant 11 is likely to notice the departure of the vehicle 10 from the lane marker 32.

Furthermore, in step S24, as a notification operation, a notification sound indicating that the vehicle 10 departs from the lane marker 32 can be output from the sound output device 23. Furthermore, the notification sound may be extended. Thus, even if the multi-information display 24 is shielded by the second region 27, the occupant 11 can further effectively notice the departure of the vehicle 10 from the lane marker 32 by the notification sound.

In step S25, the calculation control device 14 determines whether the extension time of the displayed notification has ended.

If the determination in step S25 is YES, that is, if the extension time of the displayed notification has ended, the calculation control device 14 advances to step S26.

If the determination in step S25 is NO, that is, if the extension time of the displayed notification has not ended, the calculation control device 14 advances to step S27.

In step S26, the calculation control device 14 cancels the displaying of the notification indicating that the vehicle 10 departs from the lane marker 32, the notification illustrated in FIG. 6B or the like. This can prevent the occupant 11 from losing concentration as a result of the notification displayed for an excessively long time.

In step S27, the calculation control device 14 determines whether another notification interrupts. Herein, an example of the other notification is a notification indicating an emergency brake because a motorcycle is passing nearby.

If the determination in step S27 is YES, that is, if another notification interrupts, the calculation control device 14 advances to step S23.

If the determination in step S27 is NO, that is, there is no other notification to interrupt, the calculation control device 14 advances to step S28.

In step S28, the calculation control device 14 determines whether the rotation angle of the steering wheel 22 detected by the steering wheel sensor 20 is within a range in which the displayed notification is easy to view.

If the determination in step S28 is YES, that is, if the notification displayed on the multi-information display 24 is favorably viewed through the first region 26 of the steering wheel 22 as illustrated in FIG. 6B, the calculation control device 14 ends the operation of the notification process.

If the determination in step S28 is NO, that is, if the notification displayed on the multi-information display 24 is difficult to view owing to the second region 27 of the steering wheel 22 as illustrated in FIG. 6C, the calculation control device 14 advances to step S24 and performs an operation of supplementing the displayed notification.

The operation that is performed if the departure is detected while the vehicle 10 is running is described above.

The above embodiment can produce the following effects.

According to this embodiment, by the operation of supplementing the displayed notification on the basis of the rotation angle of the steering wheel 22, the occupant 11 may easily notice the displayed notification, which may increase the safety while the vehicle 10 is driven.

Furthermore, by the display device 17 performing an operation of extending the displayed notification, even if it is difficult to view the displayed notification owing to the steering wheel 22, the occupant 11 may easily notice the displayed notification.

Furthermore, by the notification sound being output in addition to the displayed notification, the occupant 11 may more easily notice the notification.

Furthermore, while the vehicle 10 is backing up, the occupant 11 can favorably notice the notification indicating that the obstacle 29 is present behind the vehicle 10.

Furthermore, while the vehicle 10 is running, the occupant 11 can favorably notice the notification indicating that the running vehicle 10 departs from the lane marker 32. In addition, since the notification that has been unviewable by being shielded by the steering wheel becomes viewable, the occupant's sense of distrust in the vehicle notification apparatus can be decreased. Furthermore, the occupant's sense of trust in the vehicle notification apparatus can be increased.

Although the embodiment of the disclosure has been described above, the disclosure is not limited to this embodiment and can be changed without departing from the spirit of the disclosure. In addition, the examples described above can be combined as appropriate.

For example, referring to FIGS. 6A to 6C, if the curvature of the lane 30 determined by the front-of-vehicle determination device 151 is greater than or equal to a certain value, the calculation control device 14 can determine that the second region 27 shields the multi-information display 24 and can perform the above operation.

Furthermore, although the vehicle 10 illustrated in FIG. 1 includes the front-of-vehicle determination device 151 and the rear-of-vehicle determination device 152 as the vehicle status determination device 15, the vehicle 10 may further include a vehicle detection device that detects a status near a side of the vehicle.

Although, in the above description, a notification about approach of the obstacle 29 is made when the approach of the obstacle 29 is detected while the vehicle is backing up and a notification about departure from a lane is made when the departure from the lane is detected while the vehicle is running, a notification may be made in other cases. For example, a notification may be made if the rear-of-vehicle determination device 152 determines that a person is jumping out forward of the vehicle 10.

Figure 7A:
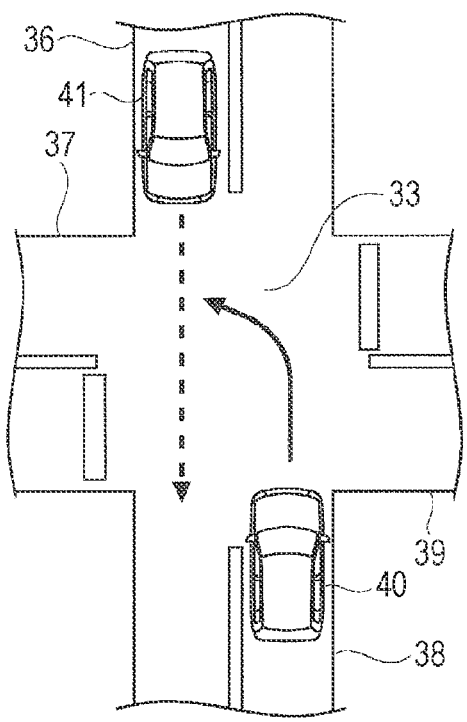
FIGS. 7A and 7B illustrate the operation of the vehicle notification apparatus according to the embodiment of the disclosure, in which FIG. 7A schematically illustrates a status in which vehicles approach each other at an intersection, and FIG. 7B schematically illustrates a status in which a vehicle approaches a pedestrian at the intersection.
Figure 7B:
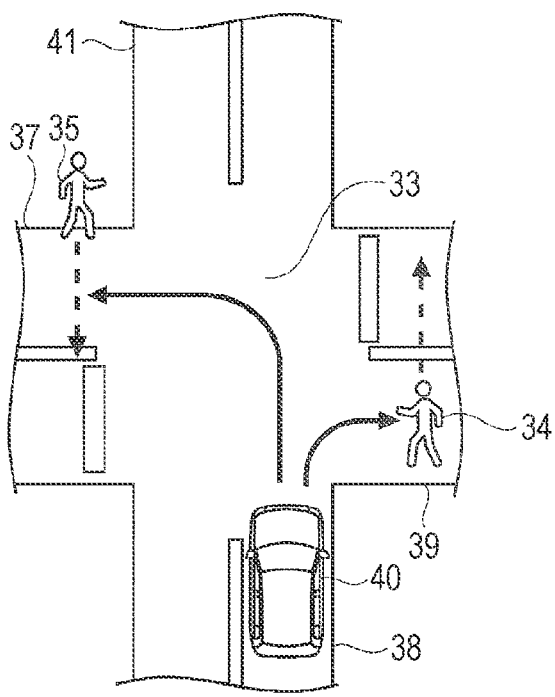

Furthermore, referring to FIGS. 7A and 7B, while the vehicle 10 is running at an intersection, the vehicle notification apparatus 13 can make a notification. FIG. 7A schematically illustrates a status in which vehicles approach each other at an intersection 33, and FIG. 7B schematically illustrates a status in which a vehicle 40 approaches a pedestrian 34 or the like at the intersection 33.

Referring to FIG. 7A, herein, the vehicle 40 is running on a road 38 toward the intersection 33, and a vehicle 41 is running on a road 36 toward the intersection 33. In this state, the occupant 11 of the vehicle 40 turns the steering wheel 22 to turn left at the intersection 33. In response to the front-of-vehicle determination device 151 of the vehicle 40 determining that the oncoming vehicle 41 is approaching the vehicle 40, the calculation control device 14 notifies the occupant 11 that the vehicle 41 is approaching the vehicle 40 by using the display device 17 or the sound output device 23. At this time, on the basis of the rotation angle of the steering wheel 22, the calculation control device 14 supplements or changes the notification by extending the notification, for example.

Referring to FIG. 7B, herein, the vehicle 40 is running on the road 38 toward the intersection 33. In addition, the pedestrian 34 is about to cross a road 39 near the intersection 33. Furthermore, a pedestrian 35 is about to cross a road 37 near the intersection 33.

In this state, the occupant 11 of the vehicle 40 turns the steering wheel 22 to turn right at the intersection 33. If the front-of-vehicle determination device 151 of the vehicle 40 determines that the pedestrian 34 is present in the traveling direction of the vehicle 40, the calculation control device 14 notifies the occupant 11 of the presence of the pedestrian 34 by using the display device 17 or the sound output device 23. At this time, on the basis of the rotation angle of the steering wheel 22, the calculation control device 14 supplements or changes the notification by extending the notification, for example. Thus, the occupant 11 can more reliably notice the notification.

Similarly, the occupant 11 of the vehicle 40 turns the steering wheel 22 to turn left at the intersection 33. If the front-of-vehicle determination device 151 of the vehicle 40 determines that the pedestrian 35 is present in the traveling direction of the vehicle 40, the calculation control device 14 notifies the occupant 11 of the presence of the pedestrian 35 by using the display device 17 or the sound output device 23. At this time, on the basis of the rotation angle of the steering wheel 22, the calculation control device 14 supplements or changes the notification by extending the notification, for example. Thus, the occupant 11 can more reliably notice the notification.

Figure 8:
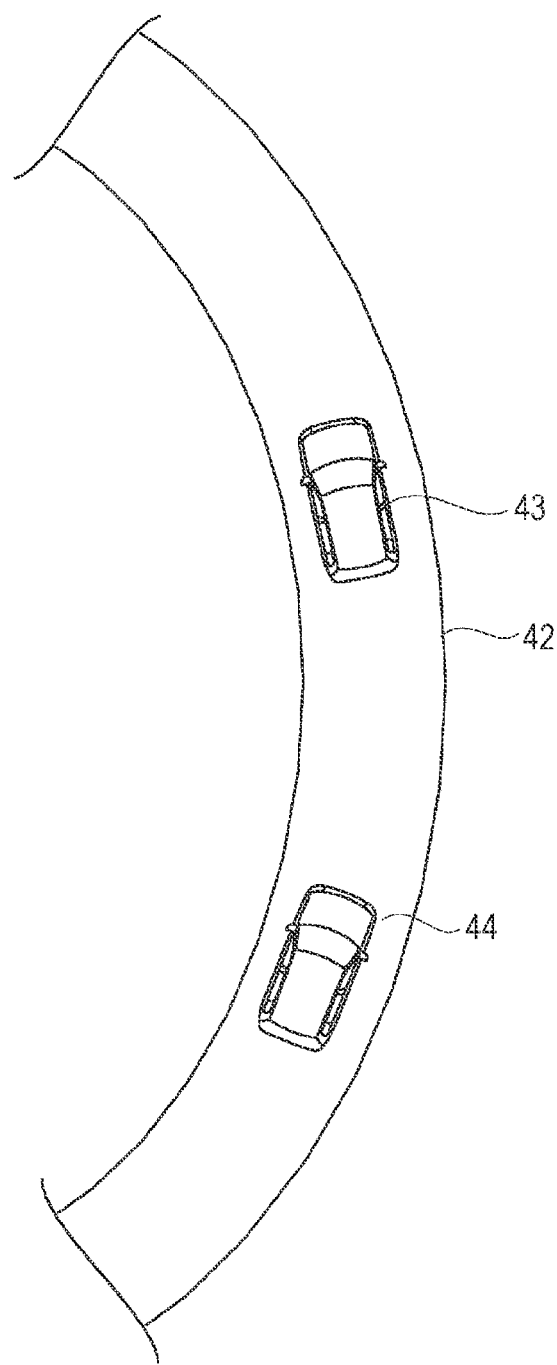
FIG. 8 illustrates the operation of the vehicle notification apparatus according to the embodiment of the disclosure and schematically illustrates a status in which a vehicle approaches another vehicle from behind on a curvy road.

Referring to FIG. 8, the notification according to the above embodiment can be made while a vehicle 44 is running on a curvy road 42. For example, while the vehicle 44 is running on the road 42, if the front-of-vehicle determination device 151 determines that an object, such as a vehicle 43 or a pedestrian or bicycle that is not illustrated, is present ahead, the calculation control device 14 notifies the occupant 11 of the presence of the object by using the display device 17 or the sound output device 23. Furthermore, to prevent or reduce collision, the calculation control device 14 starts an automatic brake system for automatically decelerating or stopping the vehicle 44. At this time, on the basis of the rotation angle of the steering wheel 22, the calculation control device 14 supplements or changes the notification by extending the notification, for example. Thus, the occupant 11 can more reliably notice the notification.

Furthermore, the above notification may be made when a motorcycle passes nearby. In one example, it is determined that the vehicle 10 enters a curvy road in an intersection to turn right or left on the basis of the rotation angle of the steering wheel 22 or another control performed by the vehicle 10 being started on the curve. Then, after the vehicle 10 has entered the curvy road, the vehicle 10 may have an issue that has not been detected before entering the curvy road, for example, an issue of a motorcycle passing nearby in the middle of turning. Subsequently, in response to an emergency brake performed by the occupant 11, for example, control other than control that is employed when the vehicle 10 normally turns right or left starts, and accordingly, in response to an instruction from the calculation control device 14, a notification is made by using the display device 17 or the sound output device 23.

In addition, in the description with reference to FIGS. 4A to 4C and FIG. 5, the notification is made when the distance between the vehicle 10 that is backing up and the obstacle 29 becomes less than a certain value. However, the notification may be made when the distance between the vehicle 10 and another vehicle becomes less than a certain value in a case where the vehicle 10 approaches the other vehicle from behind. Furthermore, the notification may be made when the distance between the vehicle 10 and the obstacle 29 or another vehicle becomes less than a certain value on the left or right side of the vehicle 10.

The technical thought that can be grasped from the above embodiment will be described below together with effects thereof.

In the vehicle notification apparatus according to the embodiment of the disclosure, the vehicle status determination device may be a front-of-vehicle determination device, the front-of-vehicle determination device may determine a lane in which the vehicle is running, and the calculation control device may perform the operation of supplementing or changing the displayed notification if the curvature of the lane determined by the front-of-vehicle determination device is greater than or equal to a certain value. Thus, by the operation of supplementing the notification on the basis of the curvature of the lane, the occupant is likely to notice the notification also when the vehicle is running on a curve.

The calculation control device 14 and the vehicle status determination device 15 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the calculation control device 14 and the vehicle status determination device 15 including the front-of-vehicle determination device 151 and the rear-of-vehicle determination device 152. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle notification apparatus comprising:
a steering wheel disposed in a vehicle, the steering wheel including a rim, a pad disposed in a region surrounded with the rim, and sporks coupling the pad with the rim, the region including a first region including no sporks, and a second region including the sporks and being adjacent to the first region;
a control device disposed in the vehicle, the control device being configured to determine, on a basis of a predetermined threshold, whether a running status of the vehicle is a status for which a notification is to be made for an occupant of the vehicle;
a display device disposed in the vehicle, the display device including a display screen configured to display a predetermined notification including a text string corresponding to the notification in a case where the control device determines that the running status of the vehicle is the status for which the notification is to be made, the display screen being disposed in or adjacently to a dashboard panel of the vehicle; and
a steering wheel sensor disposed in the vehicle, the steering wheel sensor being configured to detect a rotation angle of the steering wheel of the vehicle while the display screen is displaying the predetermined notification including the text string, wherein
the display screen is disposed at a position forward of the steering wheel where the displayed predetermined notification including the text string is visible through the first region of the steering wheel in a view from rearward of the steering wheel when the rotation angle of the steering wheel is within a first range, and
the control device is further configured to:
perform an operation of extending a display time of the displayed predetermined notification including the text string based on determining that the rotation angle of the steering wheel detected by the steering wheel sensor is within a second range in which the second region of the steering wheel shields, in the view, the displayed predetermined notification including the text string, and
perform an operation of ending the displayed predetermined notification including the text string based on determining that the rotation angle of the steering wheel detected by the steering wheel sensor is within the first range after performing the operation of extending the display time.

2. The vehicle notification apparatus according to claim 1, wherein the display device is a multi-information display device.

3. The vehicle notification apparatus according to claim 1, further comprising:
a sound output device,
wherein the sound output device is configured to output, in a cabin of the vehicle, a sound for making a notification for the occupant.

4. The vehicle notification apparatus according to claim 2, further comprising:
a sound output device,
wherein the sound output device is configured to output, in a cabin of the vehicle, a sound for making a notification for the occupant.

5. The vehicle notification apparatus according to claim 1, wherein the control device is further configured to detect whether an obstacle is present behind the vehicle, and
wherein, the display screen is configured to display the predetermined notification in response to an instruction from the control device in a case where the control device determines that the obstacle is present behind the vehicle.

6. The vehicle notification apparatus according to claim 2, wherein the control device is further configured to detect whether an obstacle is present behind the vehicle, and
wherein, the display screen is configured to display the predetermined notification in response to an instruction from the control device in a case where the control device determines that the obstacle is present behind the vehicle.

7. The vehicle notification apparatus according to claim 3, wherein the control device is further configured to detect whether an obstacle is present behind the vehicle, and
wherein, the display screen is configured to display the predetermined notification in response to an instruction from the control device in a case where the control device determines that the obstacle is present behind the vehicle.

8. The vehicle notification apparatus according to claim 4, wherein the control device is further configured to detect whether an obstacle is present behind the vehicle, and
wherein, the display screen is configured to display the predetermined notification in response to an instruction from the control device in a case where the control device determines that the obstacle is present behind the vehicle.

9. The vehicle notification apparatus according to claim 1,
wherein the control device is configured to detect a lane of a road on which the vehicle is running,
wherein the control device is configured to determine whether the vehicle departs from the lane on a basis of the lane detected by the control device, and
wherein the display screen is configured to display the predetermined notification in response to an instruction from the control device in a case where the control device determines that the vehicle departs from the lane.

10. The vehicle notification apparatus according to claim 2,
wherein the control device is configured to detect a lane of a road on which the vehicle is running,
wherein the control device is configured to determine whether the vehicle departs from the lane on a basis of the lane detected by the control device, and
wherein the display screen is configured to display the predetermined notification in response to an instruction from the control device in a case where the control device determines that the vehicle departs from the lane.

11. The vehicle notification apparatus according to claim 3,
wherein the control device is configured to detect a lane of a road on which the vehicle is running,
wherein the control device is configured to determine whether the vehicle departs from the lane on a basis of the lane detected by the control device, and
wherein the display screen is configured to display the predetermined notification in response to an instruction from the control device in a case where the control device determines that the vehicle departs from the lane.

12. The vehicle notification apparatus according to claim 4,
wherein the control device is configured to detect a lane of a road on which the vehicle is running,
wherein the control device is configured to determine whether the vehicle departs from the lane on a basis of the lane detected by the control device, and
wherein the display screen is configured to display the predetermined notification in response to an instruction from the control device in a case where the control device determines that the vehicle departs from the lane.

13. The vehicle notification apparatus according to claim 1, further comprising the dashboard panel.

14. A vehicle notification apparatus comprising:
a steering wheel disposed in a vehicle, the steering wheel including a rim, a pad disposed in a region surrounded with the rim, and sporks coupling the pad with the rim, the region including a first region including no spork, and a second region including the sporks and being adjacent to the first region;
circuitry disposed in the vehicle, the circuitry being configured to determine, on a basis of a predetermined threshold, whether a running status of the vehicle is a status for which a notification is to be made for an occupant of the vehicle;
a display device disposed in the vehicle, the display device including a display screen configured to display a predetermined notification including a text string corresponding to the notification in a case where the circuitry determines that the running status of the vehicle is the status for which the notification is to be made, the display screen being disposed in or adjacently to a dashboard panel of the vehicle; and
a steering wheel sensor disposed in the vehicle, the steering wheel sensor being configured to detect a rotation angle of the steering wheel of the vehicle while the display screen is displaying the predetermined notification including the text string,
wherein the display screen is disposed at a position forward of the steering wheel where the displayed predetermined notification including the text string is visible through the first region of the steering wheel in a view from rearward of the steering wheel when the rotation angle of the steering wheel is within a first range, and
wherein the circuitry is configured to:
perform an operation of extending a display time of the displayed predetermined notification including the text string based on determining that the rotation angle of the steering wheel detected by the steering wheel sensor is within a first second range in which the second region of the steering wheel shields, in the view, the displayed predetermined notification including the text string, and
perform an operation of ending the displayed predetermined notification including the text string based on determining that the rotation angle of the steering wheel detected by the steering wheel sensor is within the first range after performing the operation of extending the display time.

15. The vehicle notification apparatus according to claim 14, further comprising the dashboard panel.

* * * * *